United States Patent
Shin

(10) Patent No.: US 11,794,516 B2
(45) Date of Patent: Oct. 24, 2023

(54) IN-WHEEL MOTOR UNIT

(71) Applicant: HYUNDAI MOBIS CO., LTD., Seoul (KR)

(72) Inventor: Kyeong Ho Shin, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 281 days.

(21) Appl. No.: 16/903,126

(22) Filed: Jun. 16, 2020

(65) Prior Publication Data

US 2020/0391547 A1 Dec. 17, 2020

(30) Foreign Application Priority Data

Jun. 17, 2019 (KR) .......................... 10-2019-0071391

(51) Int. Cl.
*B60B 27/00* (2006.01)
*B60K 7/00* (2006.01)

(52) U.S. Cl.
CPC ...... *B60B 27/0015* (2013.01); *B60B 27/0052* (2013.01); *B60B 27/0063* (2013.01); *B60K 7/0007* (2013.01); *B60B 2900/114* (2013.01)

(58) Field of Classification Search
CPC ............ B60B 27/0015; B60B 27/0052; B60B 27/0063; B60B 2900/114; B60B 25/004; B60B 27/0047; B60K 7/0007; B60K 2007/0038; B60K 2007/0092; B60K 2007/0061; B60Y 2304/07; H02K 7/006; H02K 7/102; H02K 11/225; B60G 17/0157; B60G 2204/43; F16D 2055/0016; F16D 2055/0066
See application file for complete search history.

(56) References Cited

U.S. PATENT DOCUMENTS

| 4,913,258 A * | 4/1990 | Sakurai ................. B60K 17/30 180/242 |
| 8,476,794 B2 * | 7/2013 | Amutham .............. H02K 21/22 310/90 |
| 2006/0158050 A1 * | 7/2006 | Maeda .................... H02K 7/14 310/58 |
| 2008/0053719 A1 * | 3/2008 | Yoshino ................. F16D 65/12 188/72.1 |

(Continued)

FOREIGN PATENT DOCUMENTS

| CN | 1848617 A | 10/2006 |
| CN | 108340768 A | 7/2018 |
| KR | 10-2011-0040459 A | 4/2011 |

OTHER PUBLICATIONS

Chinese Office Action dated Dec. 8, 2022, in counterpart Chinese Patent Application No. 202010536631.0 (6 Pages in Chinese).

*Primary Examiner* — Drew J Brown
(74) *Attorney, Agent, or Firm* — NSIP Law

(57) ABSTRACT

An in-wheel motor unit may include: a rim member having a tire installed along an outer circumference thereof; a spoke connected to the rim member and rotated with the rim member; a motor part located in a mounting space formed by the rim member and the spoke, and configured to generate rotational power through power supply, and rotate the spoke; a knuckle part connected to the motor part and configured to support a suspension part; and a hub part having one side fixed to the spoke and the other side connected to the knuckle part, and configured to rotatably support the spoke.

13 Claims, 12 Drawing Sheets

(56) References Cited

U.S. PATENT DOCUMENTS

| | | | |
|---|---|---|---|
| 2008/0283314 A1* | 11/2008 | Suzuki | H02K 15/14 |
| | | | 180/65.51 |
| 2010/0163323 A1* | 7/2010 | Pickholz | B60K 7/0007 |
| | | | 310/67 R |
| 2014/0117744 A1* | 5/2014 | Vogler | B60K 7/0007 |
| | | | 301/6.5 |
| 2015/0061440 A1* | 3/2015 | Catalan | H02K 16/00 |
| | | | 310/156.01 |
| 2019/0120311 A1* | 4/2019 | Al-Mahshi | B60T 1/065 |
| 2019/0273412 A1* | 9/2019 | Tai | B60K 7/0007 |
| 2021/0031615 A1* | 2/2021 | Li | B60K 7/0007 |

\* cited by examiner

IN-WHEEL MOTOR UNIT

CROSS-REFERENCE TO RELATED APPLICATION

This application claims priority from and the benefit of Korean Patent Application No. 10-2019-0071391, filed on Jun. 17, 2019, which is hereby incorporated by reference for all purposes as if set forth herein.

BACKGROUND

Field

Exemplary embodiments of the present disclosure relate to an in-wheel motor unit, and more particularly, to an in-wheel motor unit in which a part related to an in-wheel motor does not interfere with a chassis part.

Discussion of the Background

Since fossil fuels are in danger of running out, electric vehicles have been developed, which drive a motor using electric energy stored in a battery, instead of vehicles using fossil fuels such as gasoline and diesel.

The electric vehicles are divided into a pure electric vehicle that drives a motor using only electric energy stored in a rechargeable battery, a solar cell vehicle that drives a motor using a photoelectric cell, a fuel cell vehicle that drives a motor using a fuel cell using hydrogen fuel, and a hybrid vehicle that uses both an engine and motor by driving the engine using fossil fuel and driving the motor using electricity.

In general, an in-wheel motor unit is used for a vehicle such as an electric vehicle, which uses electricity as a power source. Unlike a device that rotationally drives wheels using power transferred through the engine, transmission and drive shaft of a gasoline or diesel vehicle, the in-wheel motor unit directly transfers power to wheels through motors disposed in left/right driving wheels or four left/right and front/rear driving wheels.

The conventional in-wheel motor unit has a problem in that a part related to an in-wheel motor protrudes into a wheel member, and thus interferes with a chassis part. Therefore, there is a need for a device capable of solving the problem.

The related art is disclosed in Korean Patent Application No. 2011-0040459 published on Apr. 20, 2011 and entitled "Apparatus of Driving Wheels for In-Wheel System".

SUMMARY

Various embodiments are directed to an in-wheel motor unit in which a part related to an in-wheel motor does not interfere with a chassis part.

In an embodiment, an in-wheel motor unit may include: a rim member having a tire installed along an outer circumference thereof; a spoke connected to the rim member and rotated with the rim member; a motor part located in a mounting space formed by the rim member and the spoke, and configured to generate rotational power through power supply, and rotate the spoke; a knuckle part connected to the motor part and configured to support a suspension part; and a hub part having one side fixed to the spoke and the other side connected to the knuckle part, and configured to rotatably support the spoke.

The spoke may include: a core member installed at a position facing the hub part; and an extension member extended radially from the core member, and connected to the circumference of the rim member.

The motor part may include: a rotor member fixed to the spoke; a rotor fixed to the rotor member and having magnetism; a stator installed at a position facing the rotor, and having magnetism; and a motor housing configured to support the stator, and connected to the knuckle part and constrained from rotating.

The in-wheel motor unit may further include a first fixing connection member configured to fix the rotor member to the motor housing, and removed after the rotor member is fixed to the spoke.

The in-wheel motor unit may further include a second fixing connection member configured to fix the spoke to the motor housing, and removed after the hub part is fixed to the spoke.

The hub part may include: a hub inner race connected to the spoke, and rotated with the spoke; and a hub outer race located outside the hub inner race with a hub bearing interposed therebetween, and connected to the knuckle part and constrained from rotating.

The in-wheel motor unit may further include: a resolver installed at a position facing the hub inner race, and configured to measure the position of the hub inner race; and an inverter configured to receive the measurement value of the resolver, and installed inside the motor part.

The in-wheel motor unit may further include a brake part located inside the motor part, and configured to constrain the rotation of the spoke according to a control signal.

The brake part may include: a disk member fixed to the spoke, and rotated with the spoke; and a caliper located inside the motor part, and moved in a direction to abut on the disk member in order to form a braking force.

In accordance with the embodiments of the present disclosure, the motor part is located inside the wheel member composed of the rim member and the spoke, and the brake part and the hub part are located in the motor part. Therefore, it is possible to increase the degree of freedom in design while the suspension part does not interfere with the in-wheel motor unit.

DETAILED DESCRIPTION OF THE ILLUSTRATED EMBODIMENTS

Hereinafter, an in-wheel motor unit will be described below with reference to the accompanying drawings through various exemplary embodiments. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
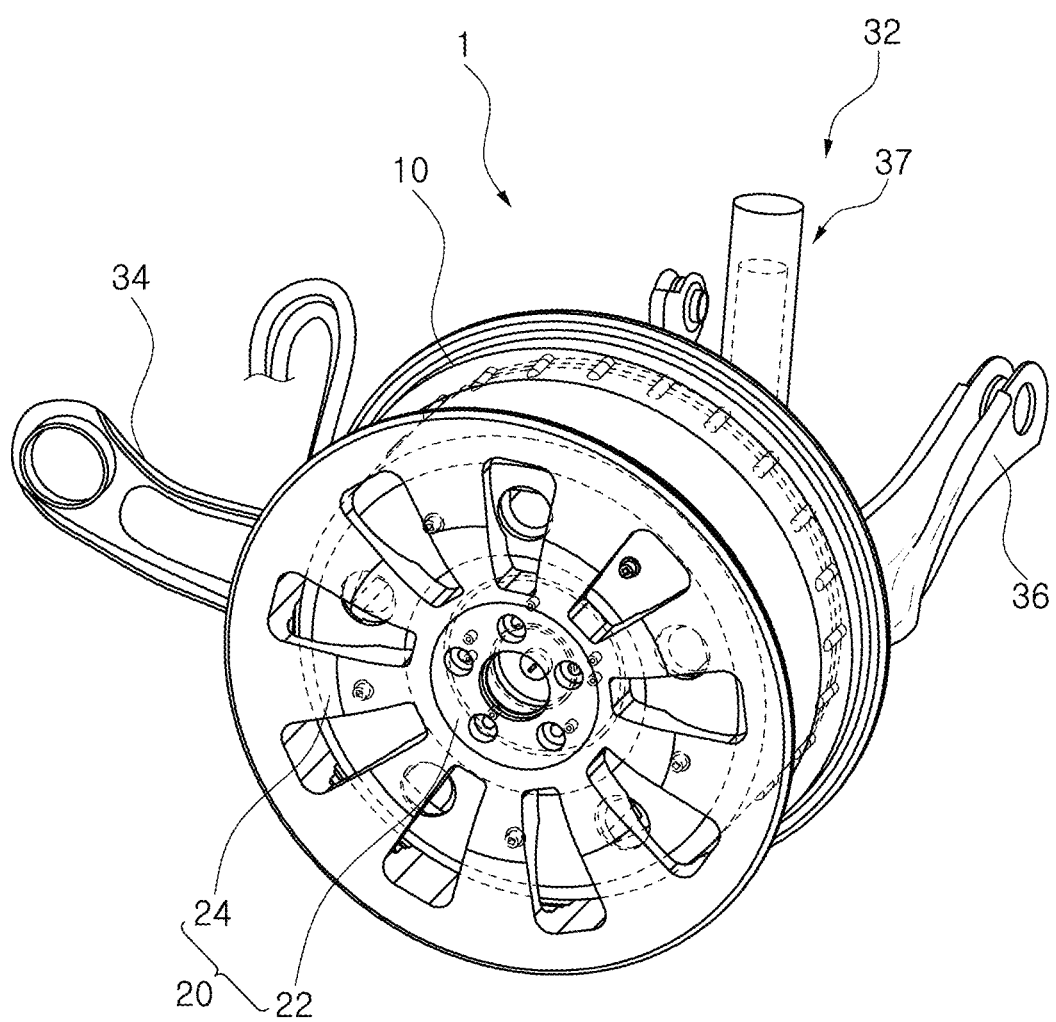
FIG. 1 is a perspective view schematically illustrating an in-wheel motor unit in accordance with an embodiment of the present disclosure.
Figure 2:
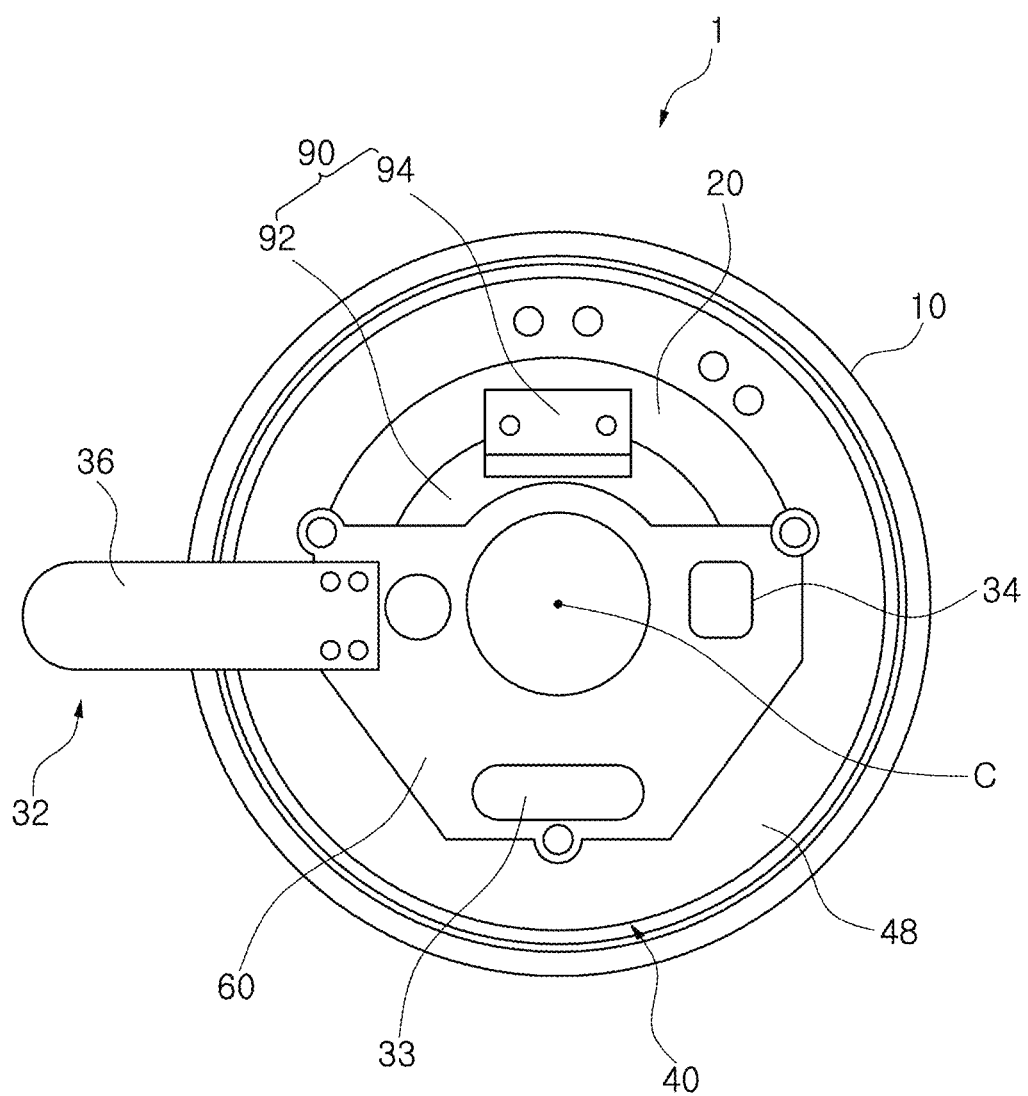
FIG. 2 is a rear view illustrating the in-wheel motor unit in accordance with the embodiment of the present disclosure.
Figure 3:
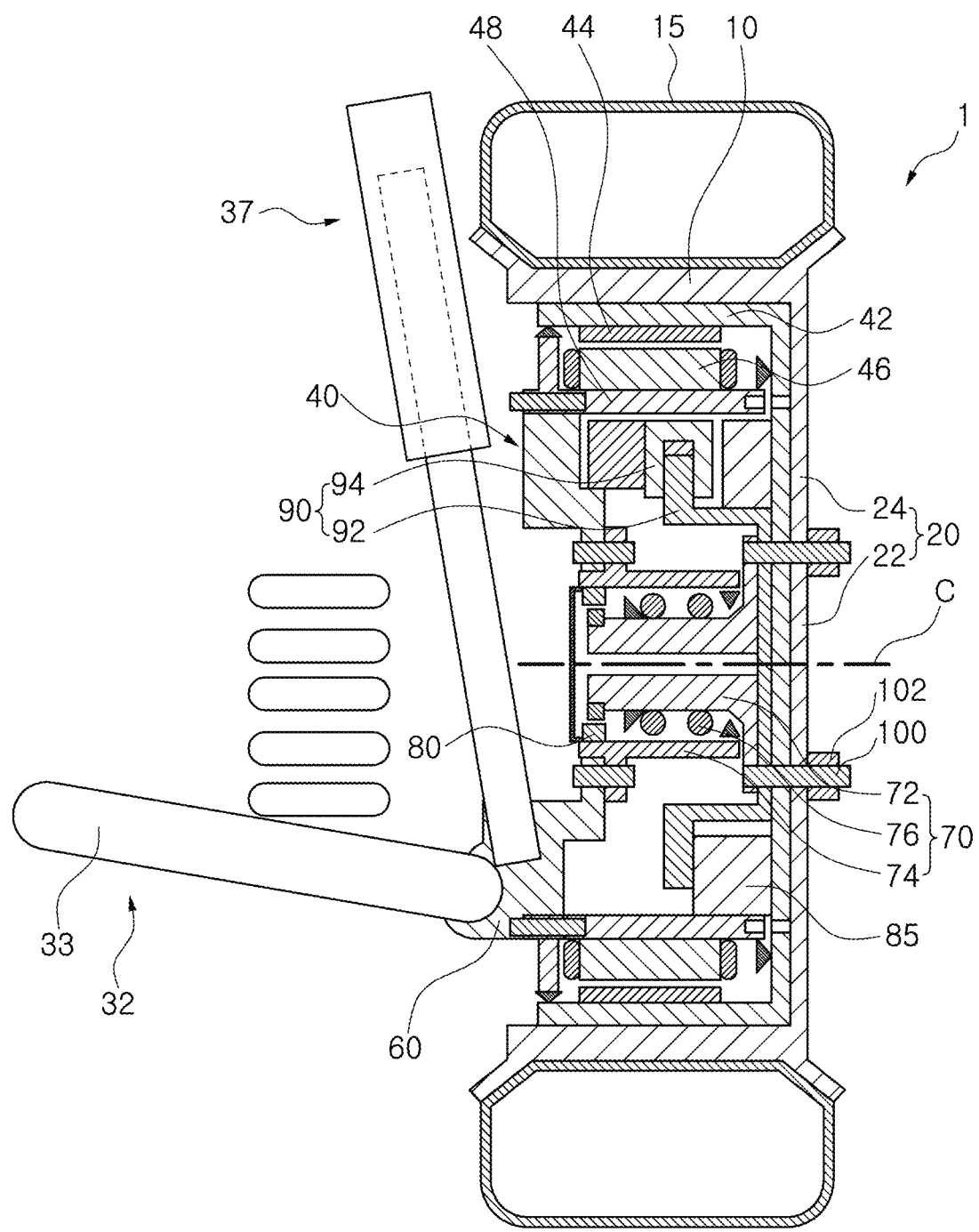
FIG. 3 is a cross-sectional view illustrating the in-wheel motor unit in accordance with the embodiment of the present disclosure.
Figure 4:
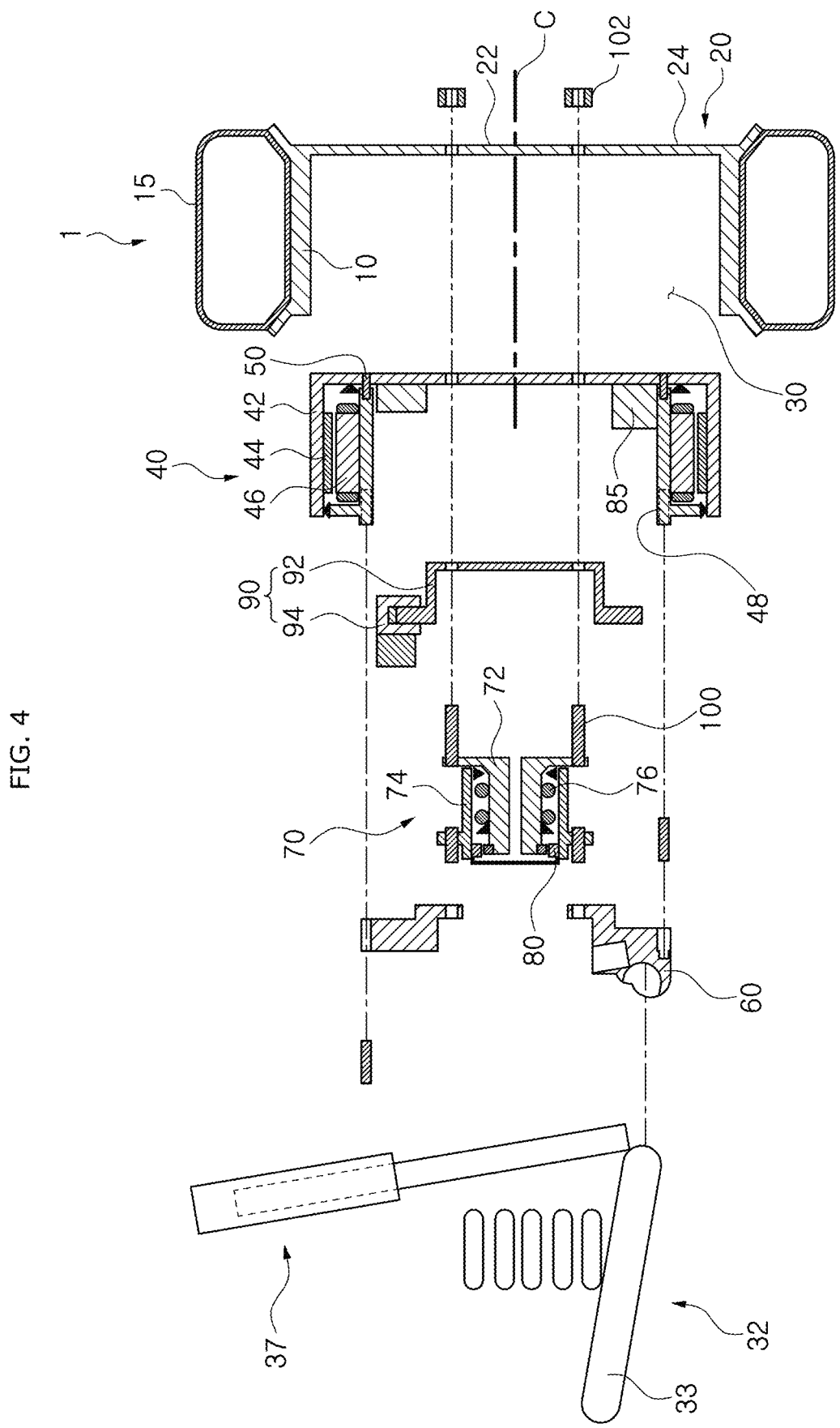
FIG. 4 is an exploded cross-sectional view illustrating main components of the in-wheel motor unit in accordance with the embodiment of the present disclosure.
Figure 5:
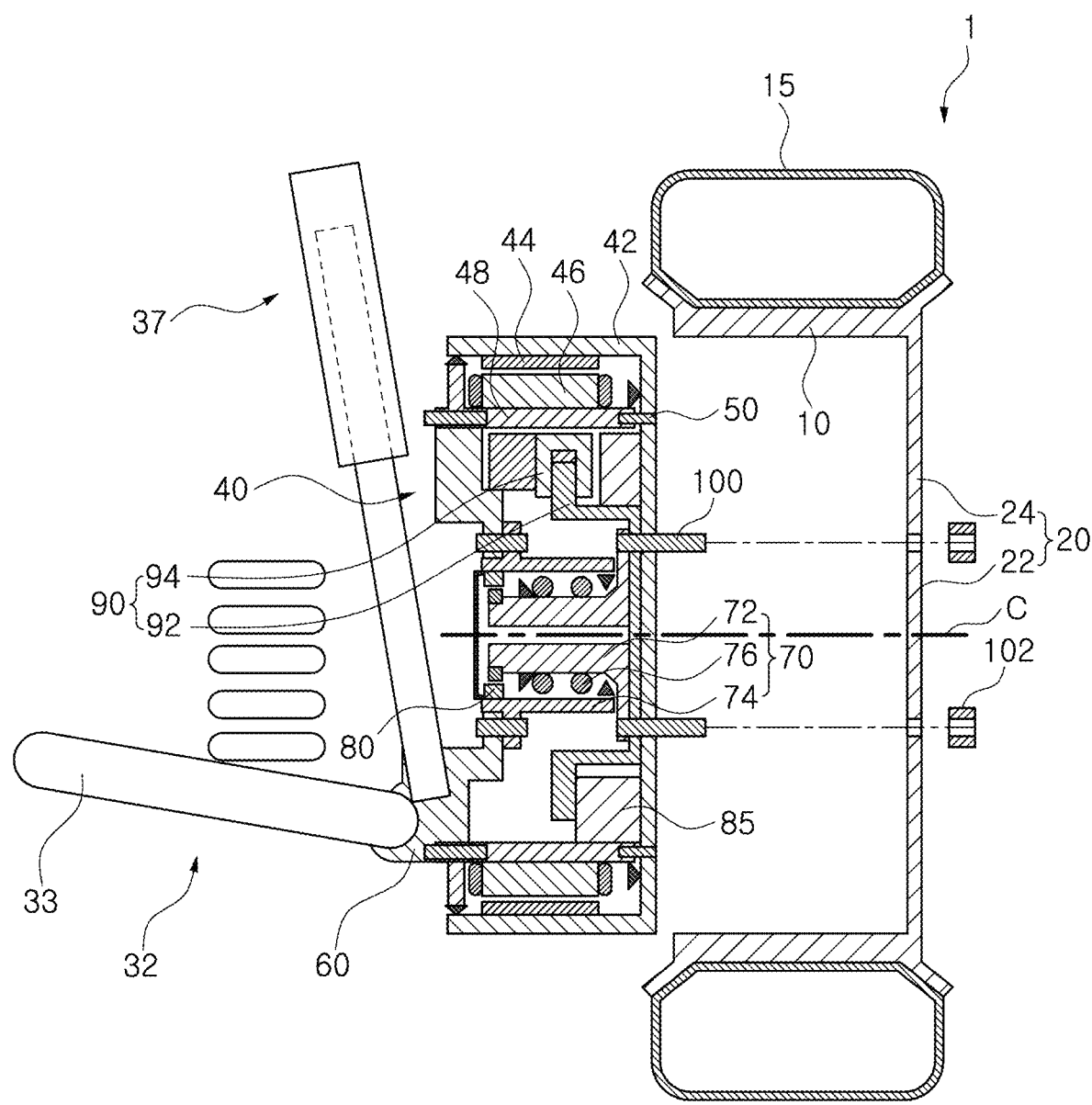
FIG. 5 is a cross-sectional view illustrating that a motor part is spaced apart from a spoke in accordance with the embodiment of the present disclosure.
Figure 6:
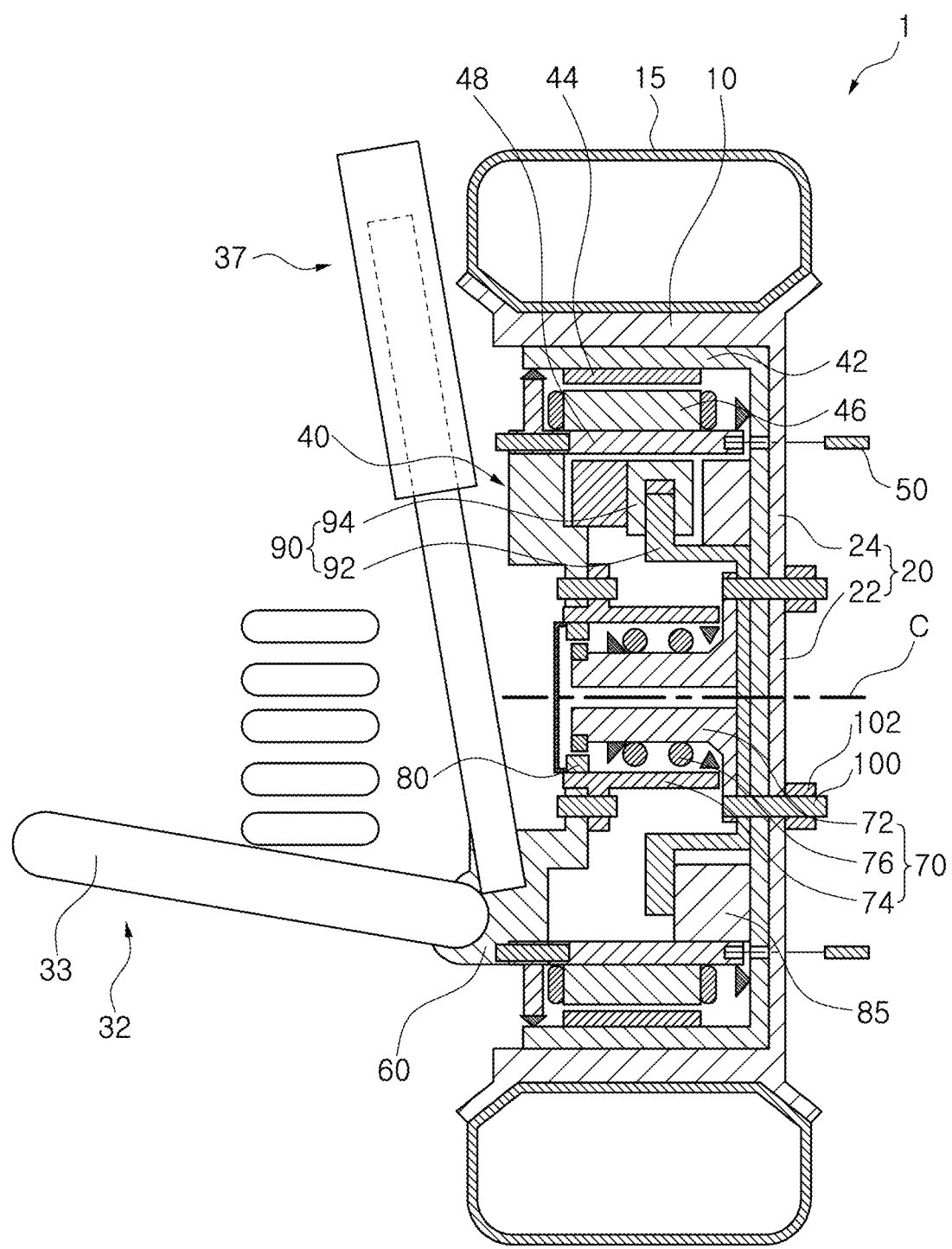
FIG. 6 is a cross-sectional view illustrating that a first fixing connection member is separated after the motor part is coupled to the spoke in accordance with the embodiment of the present disclosure.

FIG. 1 is a perspective view schematically illustrating an in-wheel motor unit in accordance with an embodiment of the present disclosure, FIG. 2 is a rear view illustrating the in-wheel motor unit in accordance with the embodiment of the present disclosure, FIG. 3 is a cross-sectional view illustrating the in-wheel motor unit in accordance with the embodiment of the present disclosure, FIG. 4 is an exploded cross-sectional view illustrating main components of the in-wheel motor unit in accordance with the embodiment of the present disclosure, FIG. 5 is a cross-sectional view illustrating that a motor part is spaced apart from a spoke in accordance with the embodiment of the present disclosure, and FIG. 6 is a cross-sectional view illustrating that a first fixing connection member is separated after the motor part is coupled to the spoke in accordance with the embodiment of the present disclosure.

As illustrated in FIGS. 1 to 6, an in-wheel motor unit 1 in accordance with the embodiment of the present disclosure includes a rim member 10, a spoke 20, a motor part 40, a knuckle part 60 and a hub part 70. The rim member 10 has a tire 15 installed along the outer circumference thereof. The spoke 20 is connected to the rim member 10 and rotated with the rim member 10. The motor part 40 is located in a mounting space 30 formed by the rim member 10 and the spoke 20, and rotates the spoke 20 using rotational power generated by power supply. The knuckle part 60 is connected to the motor part 40 and supports a suspension part 32. The hub part 70 has one side fixed to the spoke 20 and the other side connected to the knuckle part 60, and rotatably supports the spoke 20. The in-wheel motor unit 1 may further include a resolver 80, an inverter 85, a brake part 90 and a first fixing connection member 50.

The tire 15 is installed along the outer circumference of the rim member 10. The rim member 10 is installed in a circumferential direction while supporting the tire 15.

The spoke 20 may be modified in various shapes as long as the spoke 20 is connected to the rim member 10 and rotated with the rim member 10. The spoke 20 in accordance with the embodiment of the present disclosure includes a core member 22 installed at a position facing the hub part 70 and an extension member 24 extended radially from the core member 22 and connected to the circumference of the rim member 10.

The spoke 20 and the rim member 10 may be formed as one body. Alternatively, the spoke 20 and the rim member 10 may be formed as separate members, and connected to each other through a fastening device. That is, the spoke 20 and the rim member 10 may be modified in various shapes.

The core member 22 is installed on the rotation center axis C of the in-wheel motor unit 1, and connected to the hub part 70 and rotated with a hub inner race 72. The extension member 24 is extended in a spoke shape and connected to the rim member 10.

The spoke 20 is connected to one side (right side in FIG. 3) of the rim member 10, and extended in the top-to-bottom direction. Therefore, the spoke 20 and the rim member 10 may be integrated with each other, and coupled to each other through a separate fastening bolt. That is, the spoke 20 and the rim member 10 may be modified in various shapes.

The rim member 10 and the spoke 20 have a U-shaped longitudinal cross-section, and internally form the mounting space 30 for installing the motor part 40, the hub part 70 and the brake part 90.

The suspension part 32 is installed on the knuckle part 60 of the in-wheel motor unit 1. The suspension part 32 includes a lower arm 33, an upper arm 34, a trailing arm 36 and a damper 37. Since the structures and operation states of the respective parts are publicly known, the detailed descriptions thereof are omitted herein.

The motor part 40 is located in the mounting space 30 formed by the rim member 10 and the spoke 20, and various types of driving devices may be used as the motor part 40, as long as the spoke 20 is rotated by rotational power generated by power supply. The motor part 40 in accordance with the embodiment of the present disclosure includes a rotor member 42, a rotor 44, a stator 46 and a motor housing 48.

The rotor member 42 is installed in a shape to face the rim member 10 and the spoke 20, and fixed to the spoke 20 and rotated with the spoke 20. The rotor member 42 in accordance with the embodiment of the present disclosure has a U-shaped longitudinal cross-section, and is fixed to a side surface of the spoke 20 by a fixing bolt 100 or a fastening member.

The rotor 44 is fixed to the rotor member 42, has magnetism, and is rotated with the rotor member 42. As the rotor 44 in accordance with the embodiment of the present disclosure, a permanent magnet is used. The rotor 44 is installed in a ring shape along the inside of the rotor member 42.

The stator 46 is installed at a position facing the rotor 44, and has magnetism. The motor housing 48 supports the stator 46, and is connected to the knuckle part 60 and constrained from rotating. Such a motor housing 48 is located inside the rotor member 42, and installed in the circumferential direction.

The stator 46 is disposed along the outer circumference of the motor housing 48, and the motor housing 48 has a hollow portion formed therein. The stator 46 which is an electromagnet generates magnetism in response to a control signal. The rotor 44 installed at a position facing the stator 46 is rotated according to a change in magnetism of the stator 46.

When the motor part 40 is a three-phase motor, the stator 46 may include a U-phase coil, a V-phase coil and a W-phase coil.

As the first fixing connection member 50, various types of fastening devices may be used as long as the fastening devices fix the rotor member 42 to the motor housing 48 and are removed after the rotor member 42 is fixed to the spoke 20. The first fixing connection member 50 in accordance with the embodiment of the present disclosure has a pin or bolt shape, and is horizontally passed through the rotor member 42 so as to be fixed to the side surface of the motor housing 48. Therefore, since the motor housing 48 and the rotor member 42 can be temporarily assembled and moved together, the time and cost required for the assembling operation can be reduced.

The knuckle part 60 may be formed in various shapes as long as the knuckle part 60 can directly support the weight of a wheel including the tire 15, the rim member 10 and the spoke 20. The knuckle part 60 is connected to the motor housing 48 and a hub outer race 74, and constrains the motor housing 48 and the hub outer race 74 from rotating. Furthermore, the knuckle part 60 is connected to the suspension part 32 so as to support the suspension part 32, and supports a load transferred to the rim member 10 and the spoke 20.

The hub part 70 may be formed in various shapes, as long as the hub part 70 has one side fixed to the rotation center axis C of the spoke 20 and the other side connected to the knuckle part 60 and rotatably supports the spoke 20. The hub part 70 in accordance with the embodiment of the present disclosure includes the hub inner race 72, the hub outer race 74 and a hub bearing 76.

The hub inner race 72 is fixed to the inner surface of the rotor member 42, and the rotor member 42 is fixed to the inner surface of the spoke 20. Therefore, the hub inner race 72 is connected to the spoke 20 and rotated with the spoke 20. The hub inner race 72 is extended in the horizontal direction, and the hub inner race 72, a disk member 92 of the brake part 90, the rotor member 42 and the spoke 20 may be connected to one another through installation of fastening members including the fixing bolt 100 and a fixing nut 102, and rotated together.

The hub bearing 76 is installed on the outside of the hub inner race 72, and thus reduces friction which occurs when the hub inner race 72 is rotated. The hub outer race 74 is located outside the hub inner race 72 with the hub bearing 76 interposed therebetween, and connected to the knuckle part 60 and constrained from rotating.

The resolver 80 is installed at a position facing the hub inner race 72, and measures the position of the hub inner race 72. The resolver 80 in accordance with the embodiment of the present disclosure is located inside the hub outer race 74, and transfers position information for motor control to the inverter 85 serving as a control unit.

The resolver 80 installed on the hub outer race 74 is a sensor for measuring the position of the rotor 44 of the motor part 40. Since the resolver 80 has higher mechanical strength and higher durability than an encoder, the resolver 80 is used as a position sensor of a motor in various fields such as an electric vehicle, robot, airplane and military device, which require high-performance and high-precision working.

The inverter 85 receives the measurement value of the resolver 80, and is installed inside the motor part 40. The inverter 85 in accordance with the embodiment of the present disclosure may be located in a space formed by the motor housing 48 and the rotor member 42, and installed in the circumferential direction.

As the brake part 90, various types of brake devices may be used as long as the brake part 90 is located inside the motor part 40 and constrains the rotation of the spoke 20 according to a control signal. The brake part 90 in accordance with the embodiment of the present disclosure includes the disk member 92 and a caliper 94.

The disk member 92 may be modified in various shapes as long as the disk member 92 is fixed to the spoke 20 and rotated with the spoke 20. The disk member 92 in accordance with the embodiment of the present disclosure is fixed between the hub inner race 72 and the rotor member 42, and rotated with the rotor member 42.

The fastening member disposed horizontally through the hub inner race 72 is sequentially passed through the disk member 92, the rotor member 42 and the spoke 20, and then fastened to a nut installed outside the spoke 20. Therefore, the hub inner race 72, the disk member 92, the rotor member 42 and the spoke 20 are rotated together.

The caliper 94 located in the motor part 40 is installed in a part such as the motor housing or the knuckle part 60, which is constrained from rotating. The caliper 94 is operated according to a control signal, and moved in a direction to abut on the disk member 92, thereby forming a braking force. Therefore, a disk-type brake device can be installed in the in-wheel motor unit 1, without changing the design of front-wheel and rear-wheel suspensions.

Hereafter, the assembly and operation states of the in-wheel motor unit 1 in accordance with the embodiment of the present disclosure will be described in detail with reference to the accompanying drawings.

As illustrated in FIG. 4, the stator 46 is fixed to the outside of the motor housing 48, and the inverter 85 is fixed to the inside of the motor housing 48. Then, the rotor 44 is installed along the inner circumference of the rotor member 42 facing the stator 46.

The motor housing 48 and the rotor member 42 are fastened by the first fixing connection member 50, and the rotation of the rotor member 42 is temporarily constrained.

The knuckle part 60 to support the suspension part 32 is connected to the motor housing 48 and constrains the movement of the motor housing 48. Furthermore, since the knuckle part 60 is connected to the hub outer race 74, the rotation of the hub outer race 74 is also constrained.

As illustrated in FIG. 5, with the hub inner race 72, the disk member 92 and the rotor member 42 sequentially disposed, the fixing bolt 100 passed through the hub inner race 72 is sequentially passed through the disk member 92 and the rotor member 42 such that the hub inner race 72, the disk member 92 and the rotor member 42 are temporarily assembled.

As illustrated in FIG. 6, the fixing nut 102 is coupled to the fixing bolt 100 protruding outward from the rotor member 42, with the spoke 20 abutting on the side surface of the rotor member 42. Thus, the hub inner race 72, the disk member 92, the rotor member 42 and the spoke 20 are rotated together.

After the rotor member 42 is completely coupled to the spoke 20, the first fixing connection member 50 for constraining the rotation of the rotor member 42 is removed. Thus, the rotation of the rotor member 42 is allowed.

The assembling process can be modified in various manners. For example, the rotor member 42 and the hub inner race 72 may be fixed through a separate fixing bolt before the spoke 20 is assembled. Then, the first fixing connection member 50 may be removed, and the spoke 20 may be coupled like typical wheel coupling.

When the in-wheel motor unit 1 is operated, the rotor 44 is moved according to a change in magnetic flux of the stator 46, and rotated with the rotor member 42. Since the disk member 92, the spoke 20 and the hub inner race 72 are rotated together by the rotation of the rotor member 42, the tire 15 is also rotated.

In addition, a process in which a load generated from the road is transferred to a vehicle body through the in-wheel motor unit 1 will be described. A load which is generated while a vehicle travels on the road is transferred to the hub inner race 72 through the rim member 10 and the spoke 20. A force transferred to the hub outer race 74 through the hub bearing 76 facing the hub inner race 72 is transferred to the suspension part 32 through the knuckle part 60 such that vibration is attenuated, and then transferred to the vehicle body.

Hereafter, an in-wheel motor unit 3 in accordance with another embodiment of the present disclosure will be described with reference to the drawings.

For convenience of description, components which are configured and operated in the same manner as those of the above-described embodiment will be represented by like reference numerals, and the detailed descriptions thereof will be omitted herein.

Figure 7:
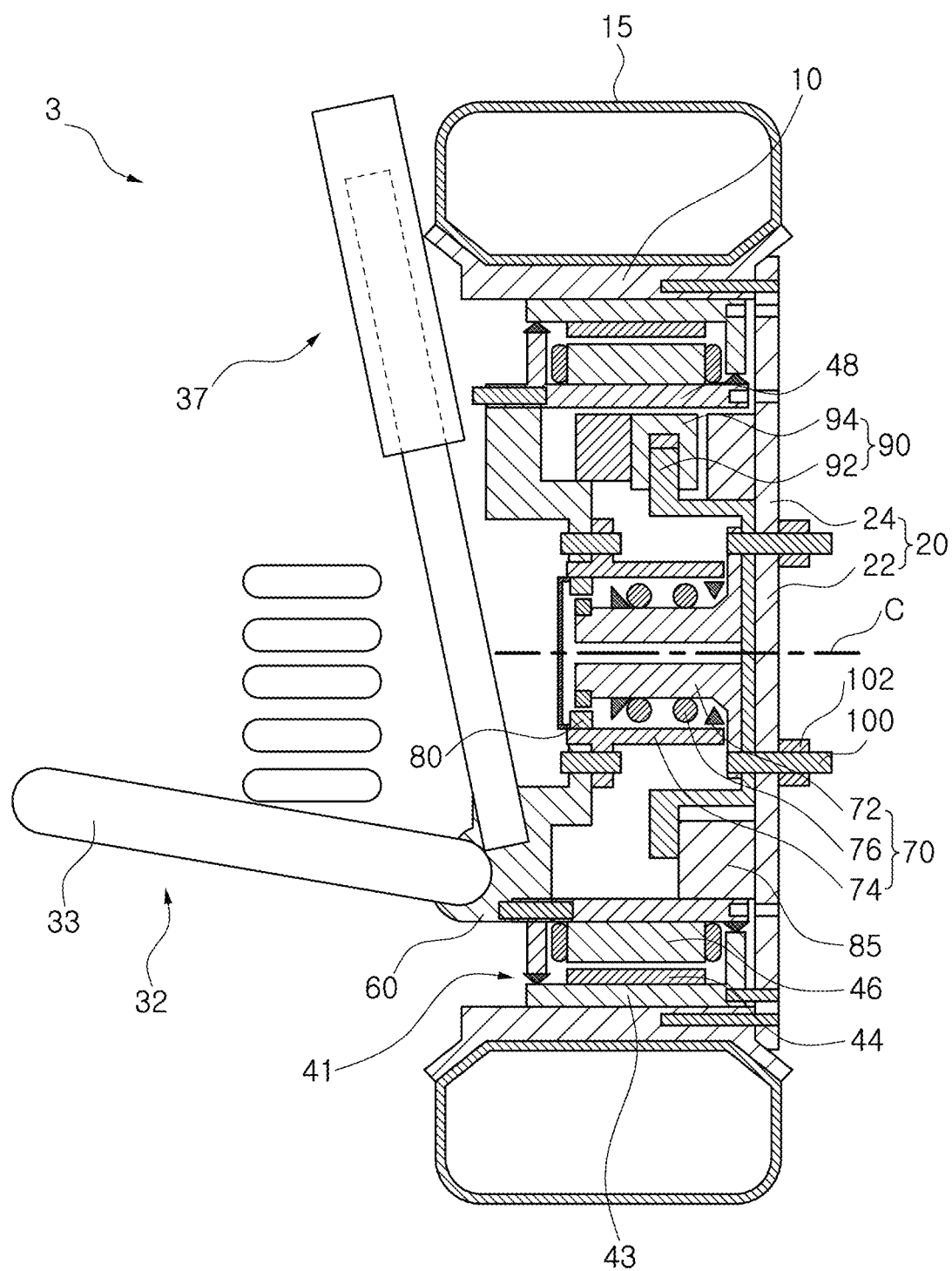
FIG. 7 is a cross-sectional view schematically illustrating an in-wheel motor unit in accordance with another embodiment of the present disclosure.
Figure 8:
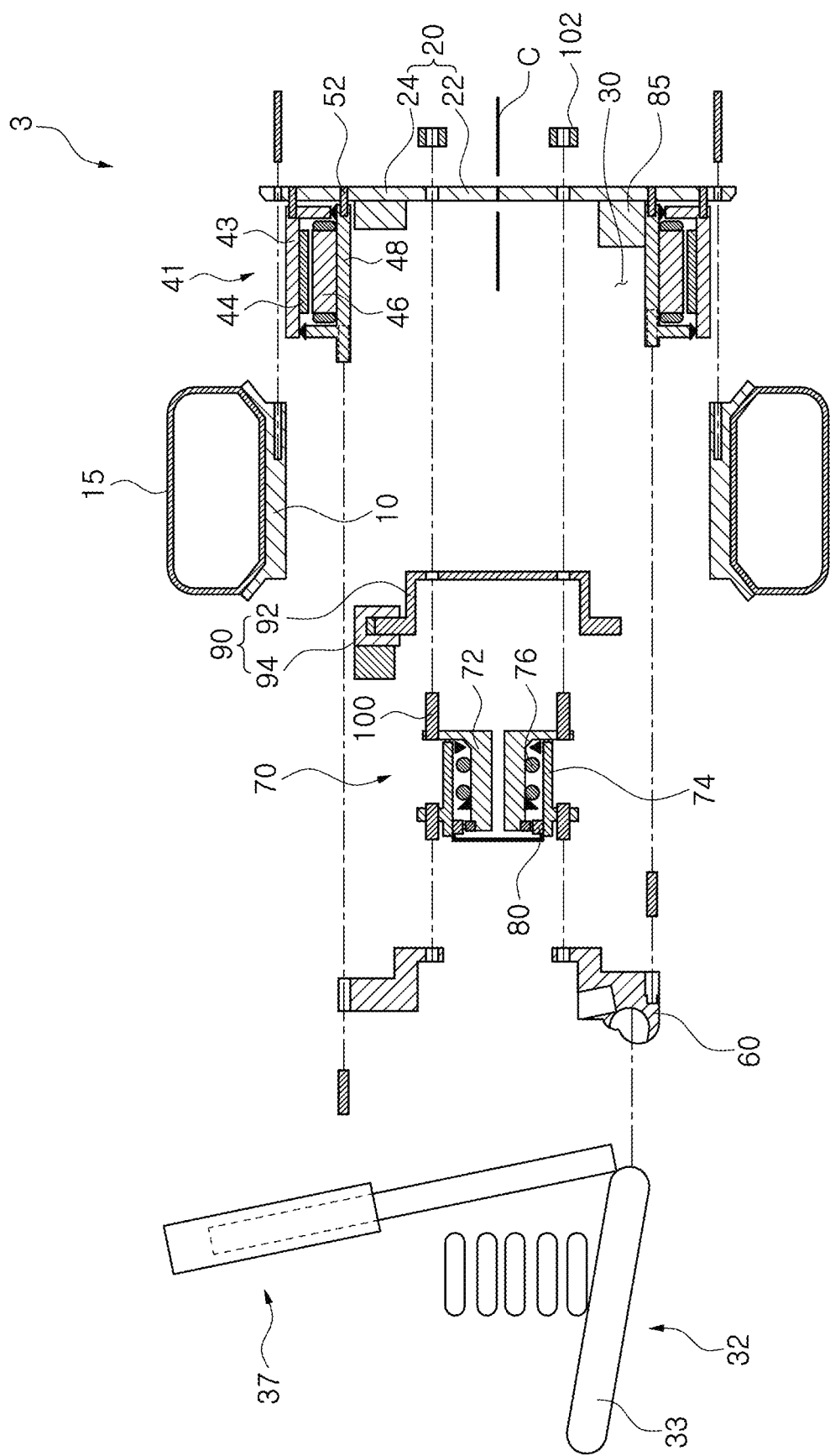
FIG. 8 is an exploded cross-sectional view illustrating main components of the in-wheel motor unit in accordance with the embodiment of the present disclosure.
Figure 9:
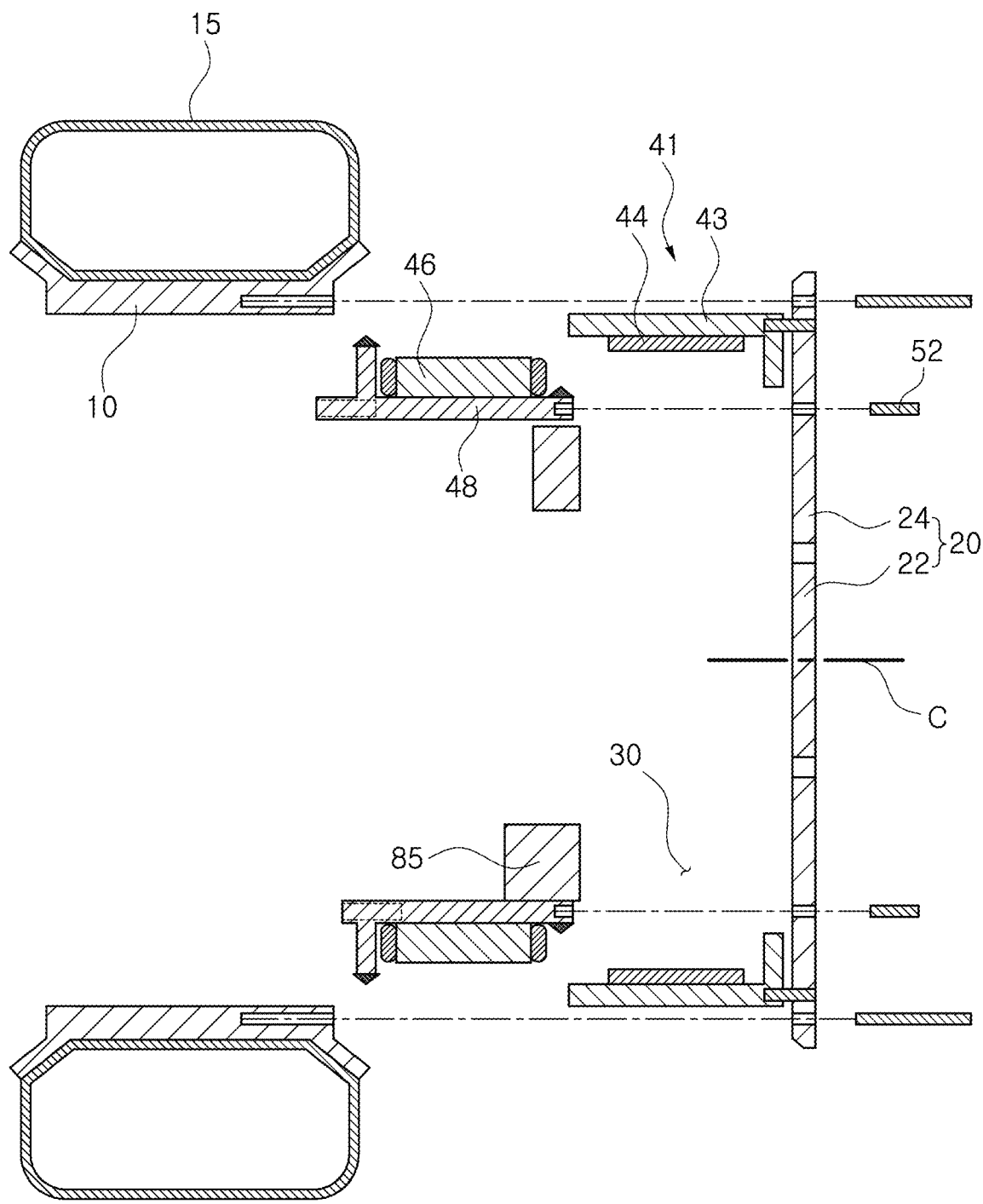
FIG. 9 is a cross-sectional view illustrating that a motor part, a spoke and a rim member in accordance with the embodiment of the present disclosure are separated from one another.
Figure 10:
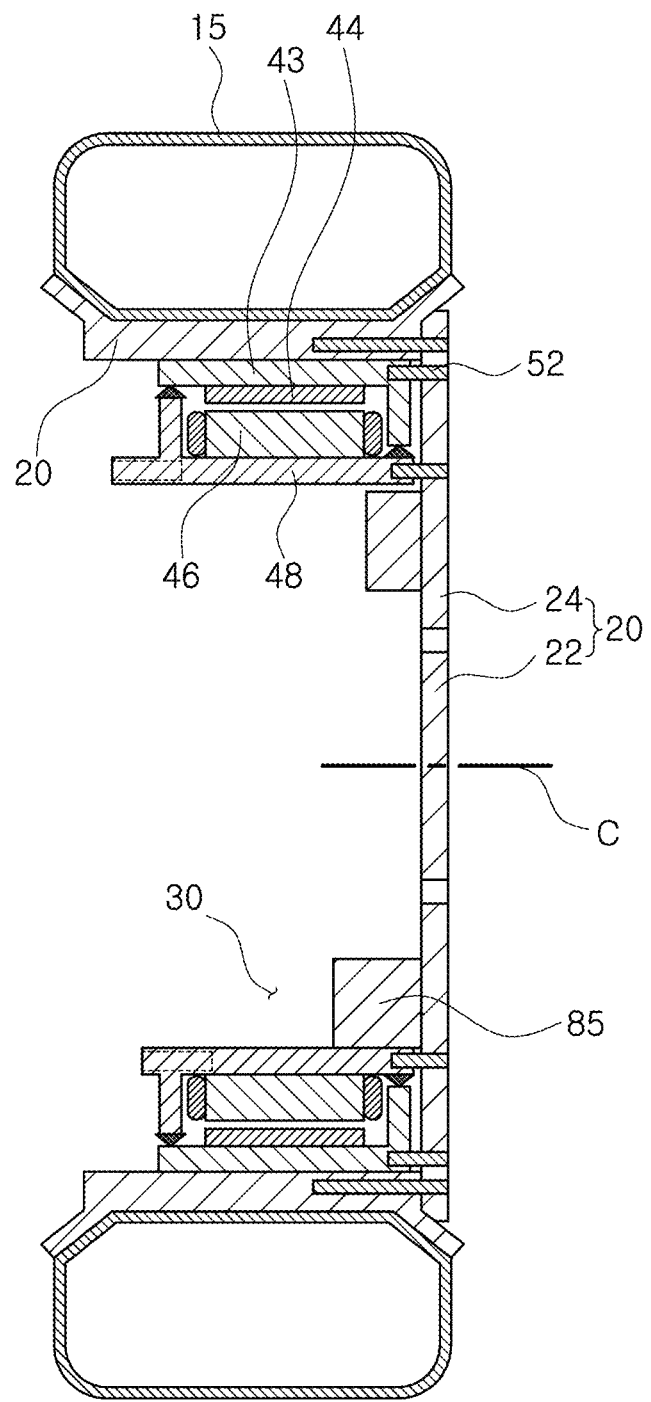
FIG. 10 is a cross-sectional view illustrating that the motor part, the spoke and the rim member in accordance with the embodiment of the present disclosure are coupled to one another.
Figure 11:
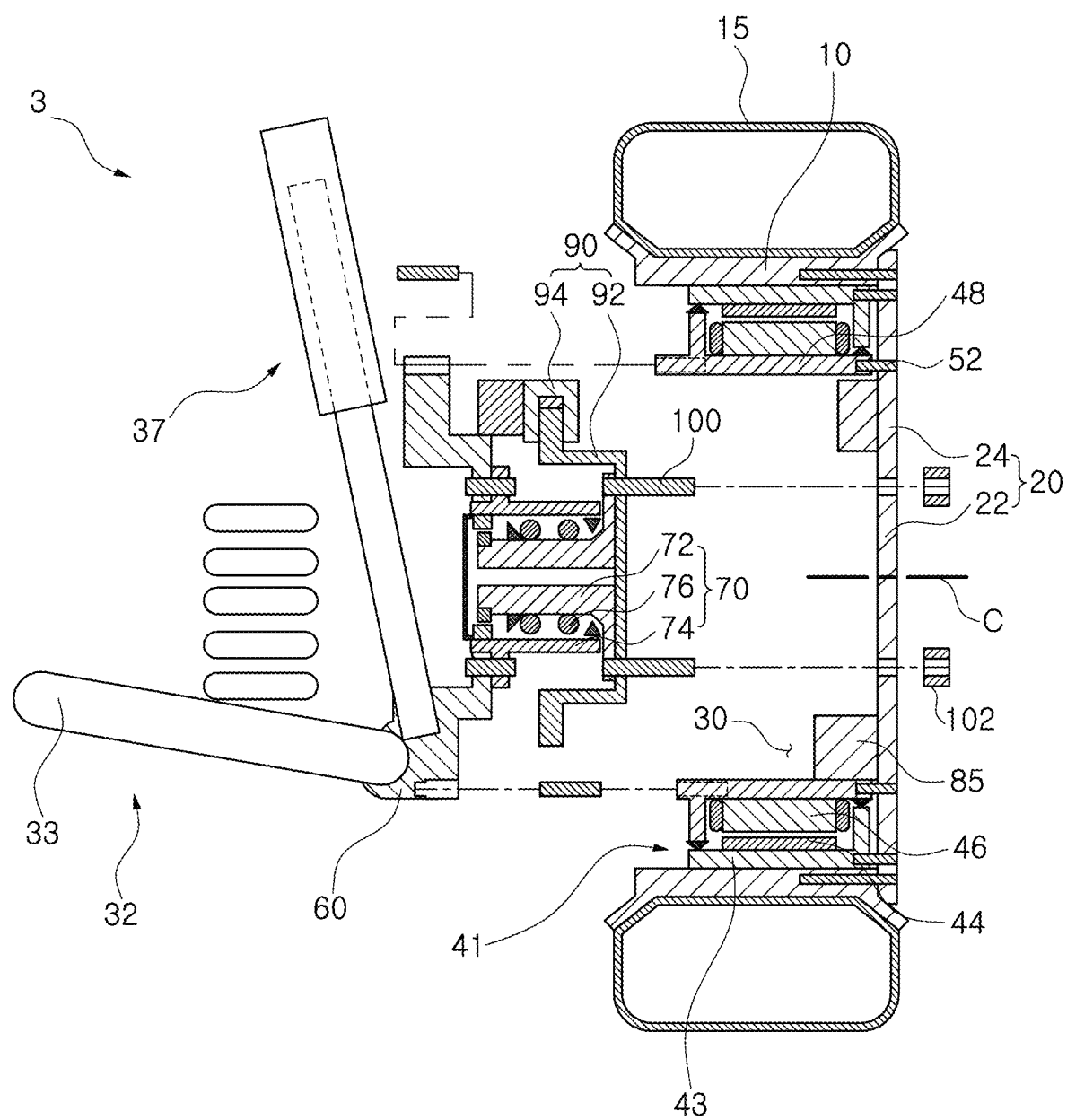
FIG. 11 is a cross-sectional view illustrating that a hub part is located at a position spaced apart from the spoke in accordance with the embodiment of the present disclosure.
Figure 12:
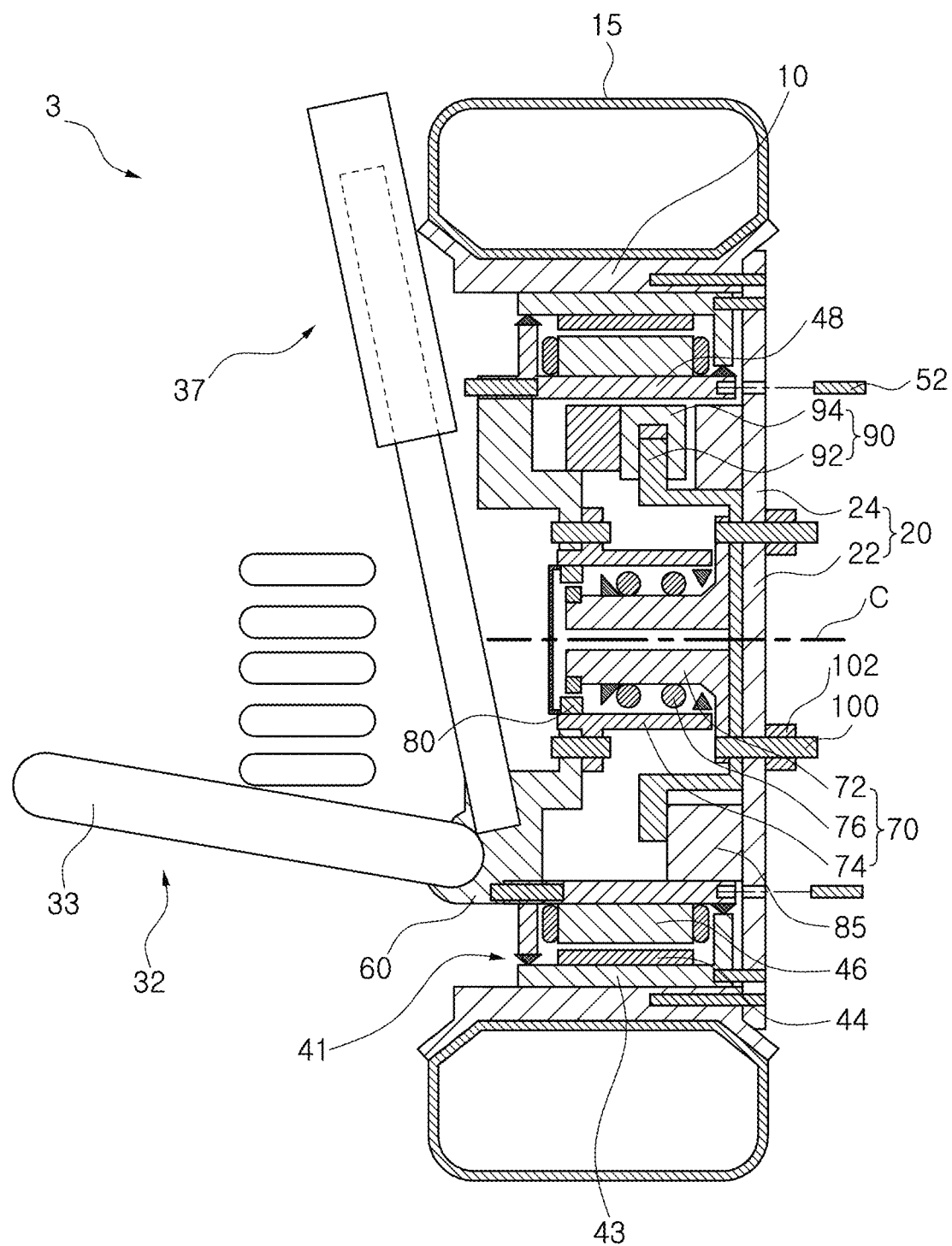
FIG. 12 is a cross-sectional view illustrating that a second fixing connection member is separated with the hub part coupled to the spoke in accordance with the embodiment of the present disclosure.

FIG. 7 is a cross-sectional view schematically illustrating an in-wheel motor unit in accordance with another embodiment of the present disclosure, FIG. 8 is an exploded cross-sectional view illustrating main components of the in-wheel motor unit in accordance with the embodiment of the present disclosure, FIG. 9 is a cross-sectional view illustrating that a motor part, a spoke and a rim member in accordance with the embodiment of the present disclosure are separated from one another, FIG. 10 is a cross-sectional view illustrating that the motor part, the spoke and the rim member in accordance with the embodiment of the present disclosure are coupled to one another, FIG. 11 is a cross-sectional view illustrating that a hub part is located at a position spaced apart from the spoke in accordance with the embodiment of the present disclosure, and FIG. 12 is a cross-sectional view illustrating that a second fixing connection member is separated with the hub part coupled to the spoke in accordance with the embodiment of the present disclosure.

As illustrated in FIGS. 7 to 12, the in-wheel motor unit 3 in accordance with the embodiment of the present disclosure may require a space secured in the axial direction of a motor part 41 in order to multiply torque, thereby implementing a system which uses the spoke 20 like a rotor.

The in-wheel motor unit 3 in accordance with the embodiment of the present disclosure includes parts which are operated and configured in the same manner as those of the in-wheel motor unit 1 in accordance with the above-described embodiment, except the shape of a rotor member 43. Therefore, the detailed descriptions of the other parts except the rotor member 43 will be omitted herein.

The motor part 41 in accordance with the embodiment of the present disclosure includes the rotor member 43 fixed to the side surface of the spoke 20. The rotor member 43 is fixed to the side surface of the spoke 20, and has an L-shaped longitudinal cross-section.

The rotor member 43 is installed at a position facing the motor housing 48 having an L-shaped longitudinal cross-section, and the stator 46 and the rotor 44 are installed in a space formed between the rotor member 43 and the motor housing 48. Between the rotor member 43 and the motor housing 48, a bearing is installed to facilitate the rotation of the rotor member 43.

A second fixing connection member 52 included in the in-wheel motor unit 3 fixes the spoke 20 to the motor housing 48, and is removed after the hub part 70 and the disk member 92 are fixed to the spoke 20.

Hereafter, the assembly state of the in-wheel motor unit 3 in accordance with the embodiment of the present disclosure will be described in detail with reference to the accompanying drawings.

As illustrated in FIGS. 8 and 9, the stator 46 is fixed to the outside of the motor housing 48, and the inverter 85 is fixed to the inside of the motor housing 48. Then, the rotor 44 is installed along the inner circumference of the rotor member 43 facing the stator 46. Then, as illustrated in FIG. 10, the rotor member 43 is contacted with the side surface of the spoke 20, and fixed to the spoke 20 through a fastening member.

The motor housing 48 and the spoke 20 are fastened to each other by the second fixing connection member 52, and the rotation of the spoke 20 is temporarily constrained.

As illustrated in FIG. 11, the knuckle part 60 supporting the suspension part 32 is connected to the hub outer race 74, and the fixing bolt 100 passed through the hub inner race 72 is installed through the disk member 92.

As illustrated in FIG. 12, the fixing bolt 100 passed through the disk member 92 is protruded outward from the spoke 20 and fastened to the fixing nut 102, with the disk member 92 brought into contact with the side surface of the spoke 20. Therefore, the hub inner race 72, the disk member 92 and the spoke 20 are rotated together. Since the knuckle part 60 is also fixed to the motor housing 48, the motor housing 48 and the hub outer race 74 are constrained from rotating.

After the rotor member 43 is completely coupled to the spoke 20, the second fixing connection member 52 for constraining the rotation of the spoke 20 is removed. Thus, the rotation of the spoke 20 is allowed.

In accordance with the embodiments of the present disclosure, the motor part 40 or 41 is located inside the wheel member composed of the rim member 10 and the spoke 20, and the brake part 90 and the hub part 70 are located in the motor part 40 or 41. Therefore, it is possible to increase the degree of freedom in design while the suspension part 32 does not interfere with the in-wheel motor unit 1 or 3.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An in-wheel motor unit comprising:
   a rim member having a tire installed along an outer circumference thereof;
   a spoke connected to the rim member and configured to rotated with the rim member;
   a motor part located in a mounting space formed by the rim member and the spoke, and configured to generate rotational power through power supplied thereto, and rotate the spoke, wherein the motor part further comprises:
   a rotor member fixed to the spoke; and
   a rotor fixed to the rotor member and having magnetism;

a knuckle part connected to the motor part and configured to support a suspension part; and a hub part having one side fixed to the spoke and the other side connected to the knuckle part, and configured to rotatably support the spoke, wherein the in-wheel motor unit is unimpeded by the suspension part.

2. The in-wheel motor unit of claim 1, wherein the spoke comprises:

a core member installed at a position facing the hub part; and an extension member extended radially from the core member, and connected to the circumference of the rim member.

3. The in-wheel motor unit of claim 1, wherein the motor part further comprises:

a stator installed at a position facing the rotor, and having magnetism; and a motor housing configured to support the stator, and connected to the knuckle part and constrained from rotating.

4. The in-wheel motor unit of claim 3, further comprising:

the rotor member fixed to the motor housing by a first fixing connection member, wherein the first fixing connection member is removed after the rotor member is fixed to the spoke; and the spoke fixed to the motor housing, wherein a second fixing connection member is removed after the hub part is fixed to the spoke and wherein an increased degree of freedom in a configuration of the motor is determined based on the first fixing connection member and the second fixing connection member.

5. The in-wheel motor unit of claim 1, wherein the hub part comprises:

a hub inner race connected to the spoke, and rotated with the spoke; and a hub outer race located outside the hub inner race with a hub bearing interposed therebetween, and connected to the knuckle part and constrained from rotating.

6. The in-wheel motor unit of claim 5, further comprising:

a resolver installed at a position facing the hub inner race, and configured to measure the position of the hub inner race; and an inverter configured to receive the measurement value of the resolver, and installed inside the motor part.

7. The in-wheel motor unit of claim 1, further comprising a brake part located inside the motor part, and configured to constrain the rotation of the spoke according to a control signal.

8. The in-wheel motor unit of claim 7, wherein the brake part comprises:

a disk member fixed to the spoke, and rotated with the spoke; and a caliper located inside the motor part, and moved in a direction to abut on the disk member in order to form a braking force.

9. The in-wheel motor unit of claim 1, wherein a degree of freedom in design of the in-wheel motor unit is increased with respect to the suspension part.

10. The in-wheel motor unit of claim 1, further comprising:

a first fixing connection member configured to fix the rotor member to the motor housing, wherein the first fixing connection member is removable after the rotor member is fixed to the spoke; and a second fixing connection member configured to fix the spoke to the motor housing, wherein is the second fixing connection member is removable after the spoke is fixed to the motor housing.

11. An in-wheel motor unit comprising:

a rim member having a tire installed along an outer circumference thereof;

a spoke connected to the rim member and rotated with the rim member;

a motor part located in a mounting space formed by the rim member and the spoke, and configured to generate rotational power through power supply, and rotate the spoke, wherein the motor part comprises a motor housing and a first fixing connection member configured to fix a rotor member to the motor housing, and removed after the rotor member is fixed to the spoke; and a hub part having one side fixed to the spoke and configured to rotatably support the spoke, wherein the in-wheel motor unit is unimpeded by the suspension part.

12. The in-wheel motor unit of claim 11, further comprising a second fixing connection member configured to fix the spoke to the motor housing, and removed after the hub part is fixed to the spoke.

13. A method of forming an in-wheel motor unit comprising:

installing a tire along an outer circumference of a rim member;

connecting a spoke to the rim member, wherein the spoke is configured to be rotated with the rim member;

disposing a motor part in a mounting space formed by the rim member and the spoke, wherein the motor part is configured to generate rotational power through power supply, and rotate the spoke, wherein the disposing the motor part further comprises:

fixing a rotor member fixed to the spoke removing a first fixing connection member; and fixing a rotor to the rotor member;

connecting a knuckle part to the motor part, wherein the knuckle part is configured to support a suspension part; and fixing one side of a hub part to the spoke and connecting the other side of hub part to the knuckle part, wherein the hub part is configured to rotatably support the spoke, and the in-wheel motor unit is unimpeded by the suspension part.

* * * * *